(12) United States Patent
Tanaka et al.

(10) Patent No.: US 12,210,205 B2
(45) Date of Patent: *Jan. 28, 2025

(54) SUBMARINE DEVICE, METHOD OF CONFIGURING SUBMARINE DEVICE, AND SUBMARINE CABLE SYSTEM

(71) Applicant: NEC Corporation, Tokyo (JP)

(72) Inventors: Akihiro Tanaka, Kanagawa (JP); Toshihide Nagasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 17/913,229

(22) PCT Filed: Feb. 3, 2021

(86) PCT No.: PCT/JP2021/003979
§ 371 (c)(1),
(2) Date: Sep. 21, 2022

(87) PCT Pub. No.: WO2021/199664
PCT Pub. Date: Oct. 7, 2021

(65) Prior Publication Data
US 2023/0176312 A1 Jun. 8, 2023

(30) Foreign Application Priority Data
Mar. 30, 2020 (JP) .................. 2020-059950

(51) Int. Cl.
*G02B 6/50* (2006.01)
(52) U.S. Cl.
CPC ............. *G02B 6/502* (2013.01); *G02B 6/506* (2013.01)
(58) Field of Classification Search
CPC ........ G02B 6/4427; G02B 6/506; G02B 6/44; G02B 6/4431; G06B 6/502
See application file for complete search history.

(56) References Cited

U.S. PATENT DOCUMENTS

| 5,125,060 A | 6/1992 | Edmundson |
| 5,210,812 A * | 5/1993 | Nilsson ................ G02B 6/4473 |
| | | 385/100 |

(Continued)

FOREIGN PATENT DOCUMENTS

| EP | 3985689 A1 | 4/2022 |
| JP | S57-073702 A | 5/1982 |

(Continued)

OTHER PUBLICATIONS

International Search Report for PCT Application No. PCT/JP2021/003979, mailed on Apr. 27, 2021.

(Continued)

*Primary Examiner* — Benjamin F Fiorello
(74) *Attorney, Agent, or Firm* — Sughrue Mion, PLLC (57) ABSTRACT

A submarine device includes a main tail cable connected to a submarine cable, a first branch tail cable including a first group of optical fibers among a plurality of optical fibers included in the main tail cable, a second branch tail cable including a second group of optical fibers among the plurality of optical fibers, a branch member that couples the main tail cable to the first and second branch tail cables and including therein a through hole for branching the plurality of optical fibers included in the main tail cable into the first group and the second group, and a device main body including a first introduction part for introducing the first branch tail cable into the device main body and a second introduction part for introducing the second branch tail cable into the device main body. The branch member is fixed to the device main body.

13 Claims, 9 Drawing Sheets

(56) References Cited

U.S. PATENT DOCUMENTS

| | | | | |
|---|---|---|---|---|
| 6,290,399 | B1* | 9/2001 | Ogiya | G02B 6/4428 |
| | | | | 385/100 |
| 9,645,341 | B2* | 5/2017 | Islam | G02B 6/4416 |
| 11,067,757 | B2* | 7/2021 | Rider | G02B 6/38 |
| 11,762,160 | B2* | 9/2023 | Nagasawa | G02B 6/4427 |
| | | | | 385/114 |
| 2017/0343759 | A1 | 11/2017 | Kishimoto et al. | |
| 2018/0329167 | A1* | 11/2018 | Kobayashi | G02B 6/443 |
| 2019/0187396 | A1 | 6/2019 | Finnegan et al. | |

FOREIGN PATENT DOCUMENTS

| | | |
|---|---|---|
| JP | S58-19043 A | 2/1983 |
| JP | H05-142428 A | 6/1993 |
| JP | H08-205375 A | 8/1996 |
| JP | H09-015465 A | 1/1997 |
| JP | 2005-215413 A | 8/2005 |
| JP | 2017-215438 A | 12/2017 |

OTHER PUBLICATIONS

US Notice of Allowance for U.S. Appl. No. 17/912,234, mailed on May 23, 2023.
International Search Report for PCT Application No. PCT/JP2021/003978, mailed on Apr. 20, 2021.

* cited by examiner

SUBMARINE DEVICE, METHOD OF CONFIGURING SUBMARINE DEVICE, AND SUBMARINE CABLE SYSTEM

This application is a National Stage Entry of PCT/JP2021/003979 filed on Feb. 3, 2021, which claims priority from Japanese Patent Application 2020-059950 filed on Mar. 30, 2020, the contents of all of which are incorporated herein by reference, in their entirety.

TECHNICAL FIELD

The present disclosure relates to a submarine device, a method of configuring the submarine device, and a submarine cable system.

BACKGROUND ART

Submarine devices connected to submarine cables and installed on the seabed is known. Patent Literature 1 discloses a submarine relay apparatus, which is a submarine device that amplifies an optical signal of a submarine cable that has been attenuated during long-distance transmission. In addition to a submarine relay apparatus, a submarine branch apparatus and an earthquake and tsunami observation apparatus are known as the submarine device. In any submarine device, a structure of a tail cable connecting a submarine cable to a submarine device main body is the same.

CITATION LIST

Patent Literature

Patent Literature 1: Japanese Unexamined Patent Application Publication No. H08(1996)-205375

SUMMARY OF INVENTION

Technical Problem

As a transmission capacity of a submarine cable increases, it is necessary to increase the number of optical fibers included in the submarine cable. The submarine device disclosed in Patent Literature 1 is provided with one introduction part for introducing a tail cable connected to the submarine cable into the device main body. The number of optical fibers that can be introduced into the device main body from one introduction part is limited for various reasons.

Therefore, the inventors have developed a submarine device including a branch member for branching one main tail cable connected to a submarine cable into a plurality of branch tail cables and configured in such a way that the branched plurality of branch tail cables are introduced into the device main body.

However, when an external force is applied to the branch member, there is a possibility that the branch member may move, causing a problem that stress is concentrated, for example, at a joint between the branch member and the main tail cable or the branch tail cables. That is, the tail cables may become less durable.

In light of such a problem, an object of the present disclosure is to provide a submarine device capable of coping with an increase in a transmission capacity of a submarine cable and having excellent durability of a tail cable.

Solution to Problem

In an example aspect of the present disclosure, a submarine device includes:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body.
The branch member is fixed to the device main body.

In another example aspect of the present disclosure, a method of configuring a submarine device includes:
branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member;
introducing the first branch tail cable into a device main body through a first introduction part and introducing the second branch tail cable into the device main body through a second introduction part; and
fixing the branch member to the device main body.

In another example aspect of the present disclosure, a submarine cable system includes:
a submarine cable; and
a submarine device connected to the submarine cable.
The submarine device includes:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body.
The branch member is fixed to the device main body.

Advantageous Effects of Invention

According to the present disclosure, it is possible to provide a submarine device capable of coping with an increase in a transmission capacity of a submarine cable and having excellent durability.

EXAMPLE EMBODIMENT

Hereinafter, specific example embodiments will be described in detail with reference to the drawings. In each drawing, the same or corresponding elements are denoted by the same reference signs, and repeated descriptions are omitted as necessary for clarity of description.

First Example Embodiment

<Configuration of Submarine Device)

Figure 1:
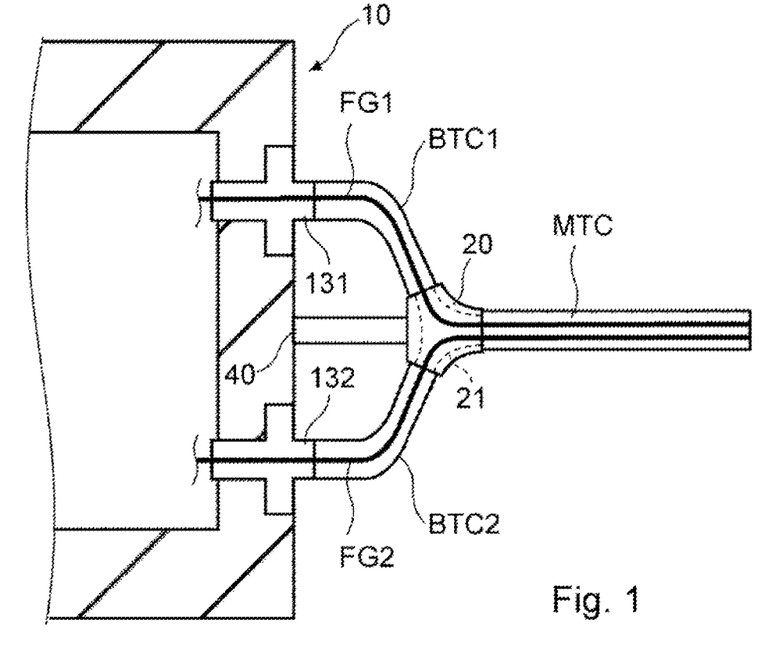
FIG. 1 is a schematic cross-sectional view showing a configuration of a submarine device according to a first example embodiment.

First, a configuration of a submarine device according to a first example embodiment will be described with reference to FIG. 1. FIG. 1 is a schematic cross-sectional view showing the configuration of the submarine device according to the first example embodiment.

As shown in FIG. 1, the submarine device according to the first example embodiment includes a device main body 10, a branch member 20, a main tail cable MTC, branch tail cables BTC1 and BTC2, and a fixing member 40.

The device main body 10 is a main body part of the submarine device. As shown in FIG. 1, the device main body 10 has an introduction part (a first introduction part) 131 for introducing the branch tail cable BTC1 and an introduction part (a second introduction part) 132 for introducing the branch tail cable BTC2.

One end of the main tail cable MTC is connected to a submarine cable (not shown in FIG. 1). The other end of the main tail cable MTC is coupled to the branch tail cables BTC1 and BTC2 through the branch member 20. The main tail cable MTC includes all optical fibers, i.e., optical fiber groups FG1 and FG2.

In FIG. 1, for ease of understanding, the optical fiber groups FG1 and FG2 inside the cable are shown by thick solid lines.

As shown in FIG. 1, one end of the branch tail cable (a first branch tail cable) BTC1 is coupled to the main tail cable MTC through the branch member 20. The other end of the branch tail cable BTC1 is introduced into the device main body 10 through the introduction part 131. The branch tail cable BTC1 includes the optical fiber group (a first optical fiber group) FG1.

As shown in FIG. 1, one end of the branch tail cable (a second branch tail cable) BTC2 is coupled to the main tail cable MTC through the branch member 20. The other end of the branch tail cable BTC2 is introduced into the device main body 10 through the introduction part 132. The branch tail cable BTC2 includes the optical fiber group (a second optical fiber group) FG2.

As shown in FIG. 1, the branch member 20 couples the main tail cable MTC to the branch tail cables BTC1 and BTC2. Further, the branch member 20 has therein a through hole 21 for branching a plurality of optical fibers included in the main tail cable MTC into the optical fiber groups FG1 and FG2.

The branch member 20, the main tail cable MTC, and the branch tail cables BTC1 and BTC2 constitute a tail cable.

The fixing member 40 fixes the branch member 20 to the device main body 10. Since the branch member 20 is fixed to the device main body 10 by the fixing member 40, the branch member 20 does not move even when an external force is applied to the branch member 20. This improves the durability of the tail cable.

As described above, in the submarine device according to the first example embodiment, one main tail cable MTC connected to the submarine cable is branched into the branch tail cable BTC1 including the optical fiber group FG1 and the branch tail cable BTC2 including the optical fiber group FG2 through the branch member 20. The branch tail cable BTC1 is introduced into the device main body 10 through the introduction part 131, and the branch tail cable BTC2 is introduced into the device main body 10 through the introduction part 132. That is, the optical fibers can be introduced into the device main body 10 through the plurality of introduction parts 131 and 132, and thus the optical fibers can cope with an increase in the transmission capacity of the submarine cable.

Moreover, since the branch member 20 is fixed to the device main body 10, the branch member 20 does not move even when an external force is applied to the branch member 20. This improves the durability of the tail cable.

In the branch member 20 shown in FIG. 1, the plurality of optical fibers included in the main tail cable MTC are branched into two groups, and instead the plurality of optical fibers included in the main tail cable MTC may be branched into three or more groups. In this case, three or more introduction parts may be provided in the device main body 10 according to the number of branches. The fixing member 40 may have any configuration as long as it is used to fix the branch member 20 to the device main body 10.

Second Example Embodiment

<Configurations of Submarine Device and Submarine Cable System>

Figure 2:
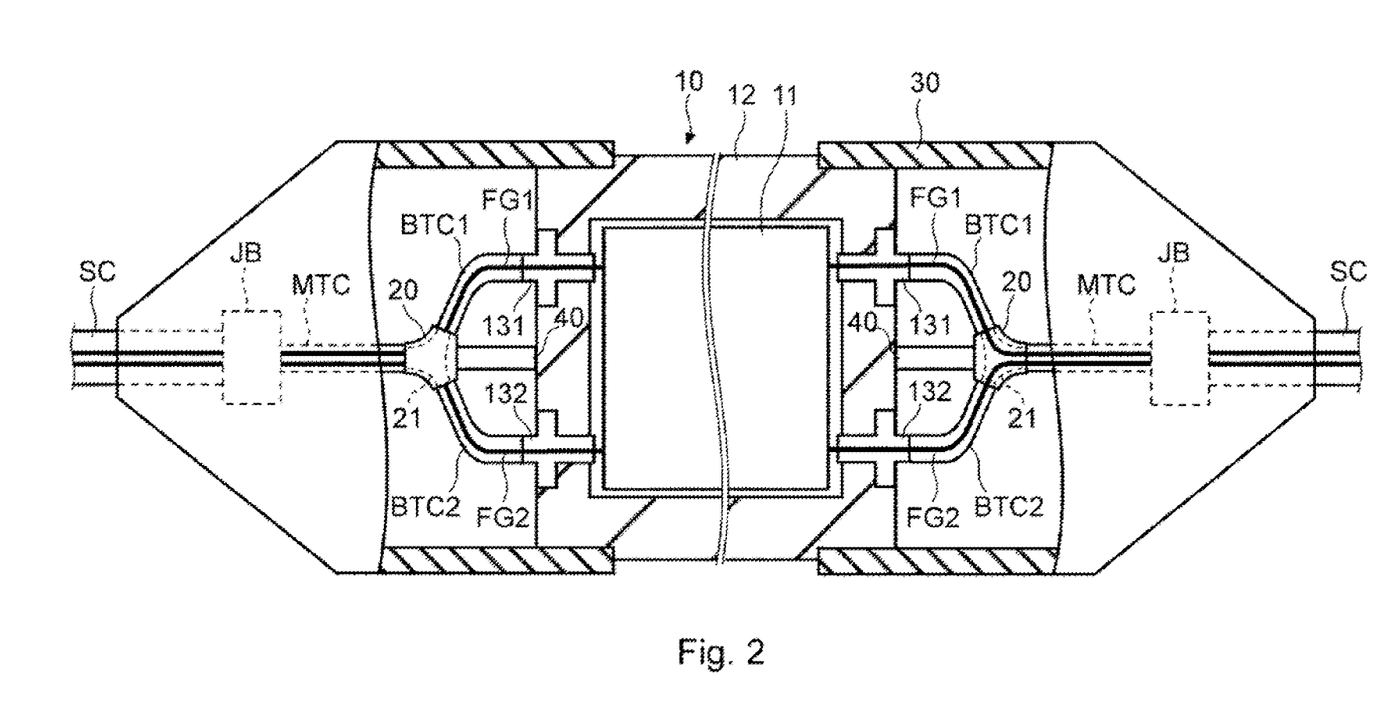
FIG. 2 is a schematic cross-sectional view showing a configuration of the submarine device and a submarine cable system according to a second example embodiment.

Next, configurations of a submarine device and a submarine cable system according to a second example embodiment will be described with reference to FIG. 2. FIG. 2 is a schematic cross-sectional view showing configurations of the submarine device and the submarine cable system according to the second example embodiment. The submarine device is, for example, a submarine relay apparatus, a submarine branch device, and an earthquake and tsunami observation apparatus.

As shown in FIG. 2, the submarine cable system according to the second example embodiment includes a submarine cable SC and a submarine device. The submarine device according to the second example embodiment includes joint boxes JB, and joint covers 30 in addition to a device main body 10, branch members 20, main tail cables MTC, branch tail cables BTC1 and BTC2, and fixing members 40 shown in FIG. 1.

As shown in FIG. 2, the submarine device according to the second example embodiment includes the branch members 20, the main tail cables MTC, the branch tail cables BTC1 and BTC2, the joint boxes JB, and the joint covers 30 at both ends of the device main body 10 in a longitudinal direction. As shown in FIG. 2, both ends of the device main body 10 in the longitudinal direction have the same configuration, and thus the configuration of one end side will be described.

The device main body 10 is a main body part of the submarine device. As shown in FIG. 2, the device main body 10 has a configuration in which an internal unit 11 is accommodated in a cylindrical pressure-resistant housing 12. In the case of a submarine relay apparatus, the internal unit 11 includes, for example, circuitry for amplifying an optical signal of the submarine cable SC which has been attenuated during long distance transmission.

The pressure-resistant housing 12 is provided with an introduction part 131 for introducing the branch tail cable BTC1 into the internal unit 11 and an introduction part 132 for introducing the branch tail cable BTC2 into the internal unit 11. The pressure-resistant housing 12 has strength to withstand water pressure at a depth of 8000 m, and is made of, for example, beryllium copper alloy. Each of the pressure-resistant housing 12 and the introduction parts 131 and 132 has an airtight structure so that seawater does not enter the inside of the pressure-resistant housing 12 from the introduction parts 131 and 132.

As shown in FIG. 2, one end of the main tail cable MTC is connected to the submarine cable SC through the joint box JB. The other end of the main tail cable MTC is coupled to the branch tail cables BTC1 and BTC2 through the branch member 20.

Here, the main tail cable MTC has a configuration in which all optical fibers (i.e., the optical fiber groups FG1 and FG2 shown in FIG. 2) are accommodated in copper pipes. The copper pipes protect the optical fiber groups FG1 and FG2 and also function as power supply lines. In the joint box JB, the power supply lines and optical fibers of the submarine cable SC and the main tail cable MTC are connected to each other.

In FIG. 2, for ease of understanding, the optical fiber groups FG1 and FG2 inside the cables are shown by thick solid lines.

As shown in FIG. 2, one end of the branch tail cable BTC1 is coupled to the main tail cable MTC through the branch member 20. The other end of the branch tail cable BTC1 is introduced into the device main body 10 through the introduction part 131 and connected to the internal unit 11. The branch tail cable BTC1 includes an optical fiber group FG1.

As shown in FIG. 2, one end of the branch tail cable BTC2 is coupled to the main tail cable MTC through the branch member 20. The other end of the branch tail cable BTC2 is introduced into the device main body 10 through the introduction part 132 and connected to the internal unit 11. The branch tail cable BTC2 includes an optical fiber group FG2.

As shown in FIG. 2, the branch member 20 couples the main tail cable MTC to the branch tail cables BTC1 and BTC2. Further, the branch member 20 has therein a through hole 21 for branching a plurality of optical fibers included in the main tail cable MTC into the optical fiber groups FG1 and FG2.

The branch member 20, the main tail cable MTC, and the branch tail cables BTC1 and BTC2 constitute a tail cable.

Details of the branch member 20 will be described later.

As shown in FIG. 2, the joint cover 30 is a hollow member composed of a cylindrical part and a conical part. The cylindrical part accommodates the branch member 20, the main tail cable MTC, and the branch tail cables BTC1 and BTC2. The conical part accommodates the joint box JB. A diameter of the conical part is tapered toward the submarine cable SC side. One end of the joint cover 30 (i.e., one end of the cylindrical part) is fitted or screwed to and fixed to the pressure-resistant housing 12 of the device main body 10. The other end of the joint cover 30 (i.e., a leading end of the conical part) is opened to introduce the submarine cable SC. Seawater enters the inside of the joint cover 30.

The fixing member 40 fixes the branch member 20 to the device main body 10. Since the branch member 20 is fixed to the device main body 10 by the fixing member 40, the branch member 20 does not move even when an external force is applied to the branch member 20. This improves the durability of the tail cable.

As described above, the submarine device according to the second example embodiment also includes the branch member 20 for branching the plurality of optical fibers included in the main tail cable MTC into the optical fiber groups FG1 and FG2. Therefore, the optical fibers can be introduced into the device main body 10 through the plurality of introduction parts 131 and 132, and thus the optical fibers can cope with an increase in the transmission capacity of the submarine cable.

Since the branch member 20 is fixed to the device main body 10 by the fixing member 40, the branch member 20 does not move even when an external force is applied to the branch member 20. This improves the durability of the tail cable.

<Details of Branch Member 20>

Figure 3:
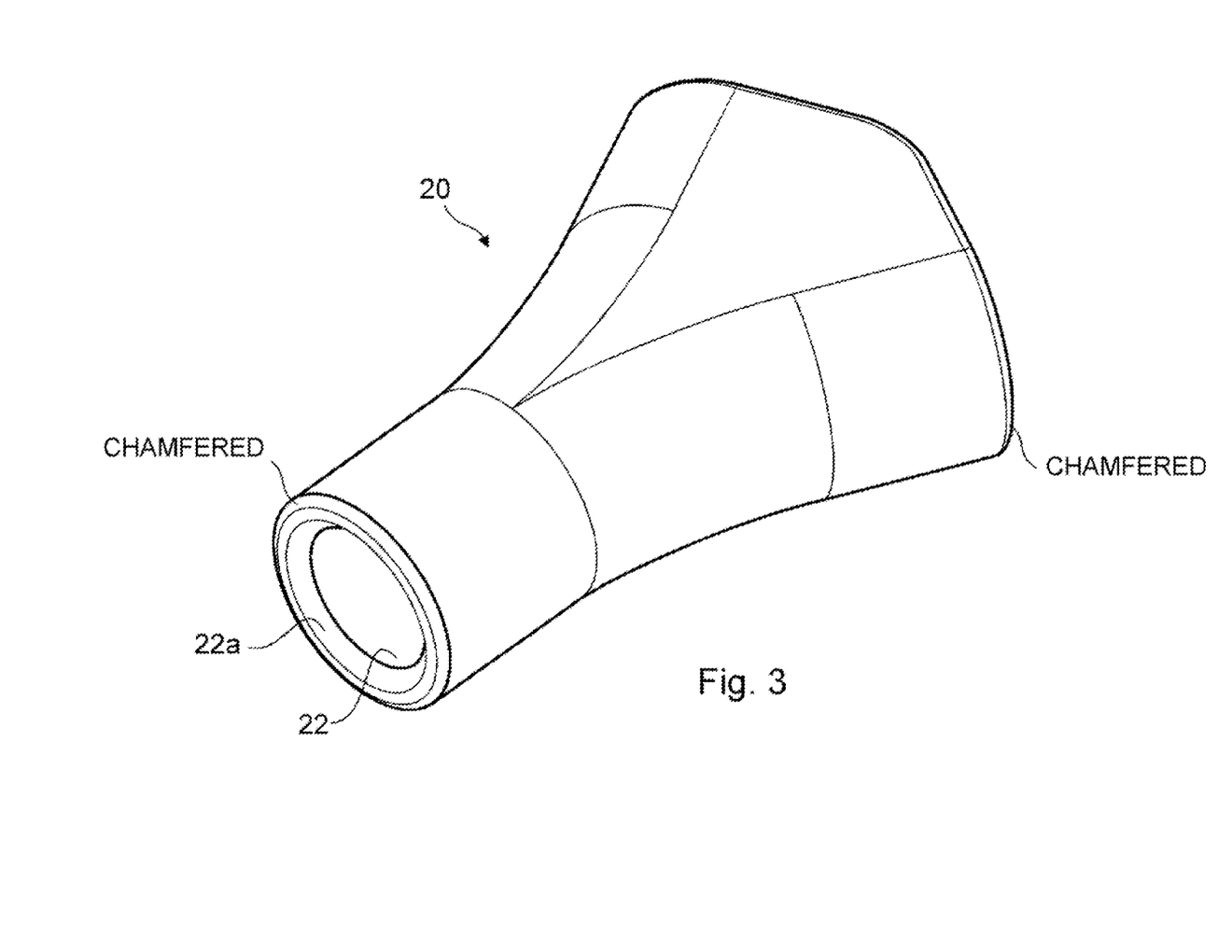
FIG. 3 is an external perspective view of a branch member 20.
Figure 4:
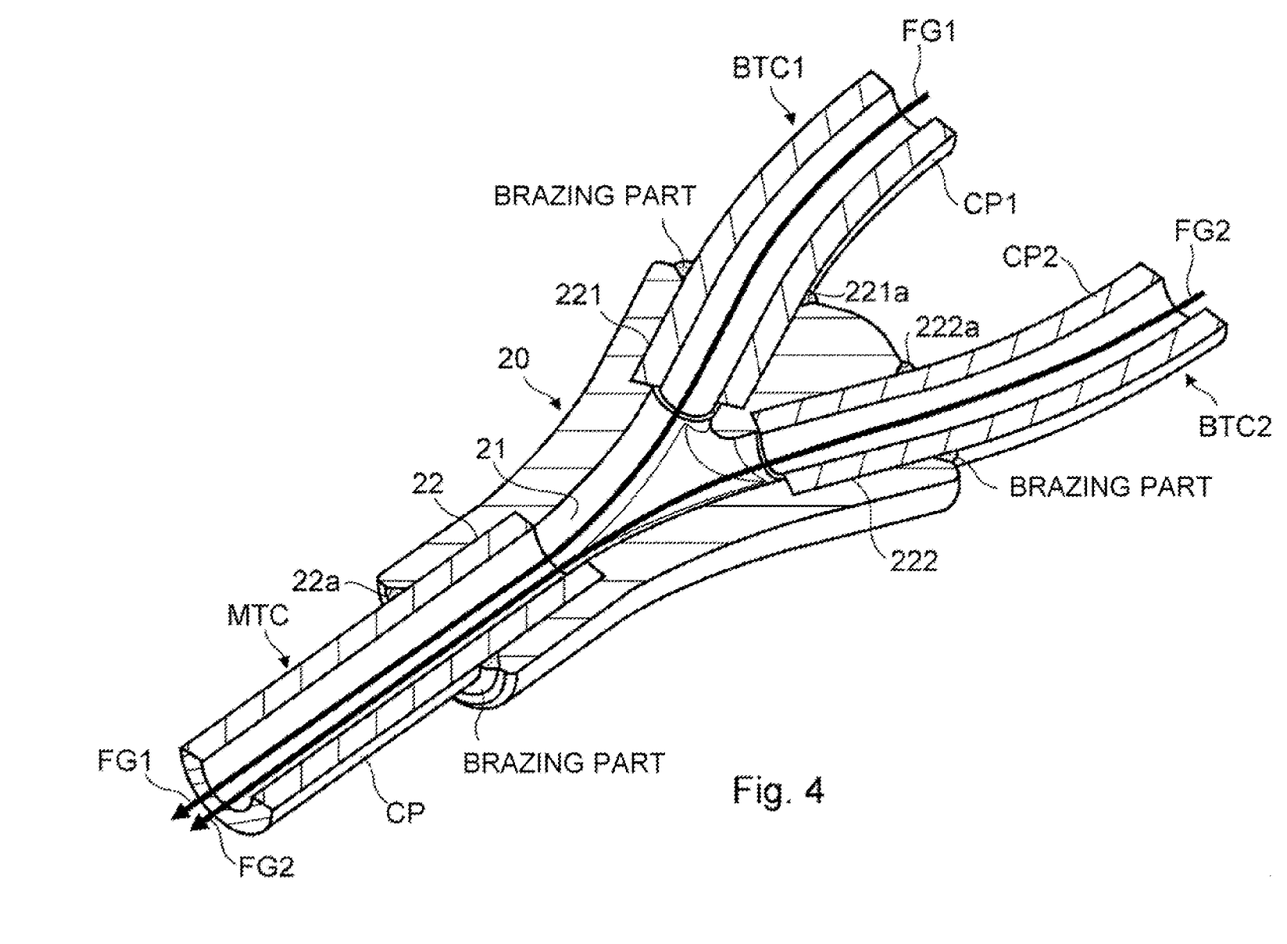
FIG. 4 is a cross-sectional perspective view of the branch member 20.

Next, the branch member 20 will be described in detail with reference to FIGS. 3 and 4. FIG. 3 is an external perspective view of the branch member 20. FIG. 4 is a cross-sectional perspective view of the branch member 20.

As shown in FIG. 4, a Y-shaped through hole 21 is formed in the branch member 20. Counterbored holes 22, 221, 222 having inner diameters larger than that of the through hole 21 are formed at three open ends of the Y-shaped through hole 21.

As shown in FIG. 4, one end part of a copper pipe CP constituting the main tail cable MTC is inserted into the counterbored hole 22 to a depth of, for example, several millimeters. As shown in FIG. 3, a tapered part 22a is formed at an open end of the counterbored hole 22 in such a way that a diameter thereof is expanded outward from an inner peripheral surface of the counterbored hole 22.

The tapered part 22a facilitates the insertion of the copper pipe CP into the counterbored hole 22 and brazing of the branch member 20 to the copper pipe CP. Specifically, as shown in FIG. 4, a gap between the tapered part 22a and the copper pipe CP is filled with a brazing material to form a ring-shaped brazing part.

As shown in FIG. 4, one end parts of the copper pipes CP1 and CP2 constituting the branch tail cables BTC1 and BTC2 are inserted into the counterbored holes 221 and 222, respectively, to a depth of, for example, several millimeters. In a manner similar the counterbored hole 22, tapered parts 221a and 222a are formed at the open ends of the counterbored holes 221 and 222, respectively, in such a way that the diameters thereof are expanded outward from the inner peripheral surface.

The tapered parts facilitate the insertion of the copper pipes CP1 and CP2 into the counterbored holes 221 and 222, respectively, and the brazing of the branch member 20 to the copper pipes CP1 and CP2. Specifically, as shown in FIG. 4, ring-shaped brazing parts are also formed at the tapered parts 221a and 222a of the counterbored holes 221 and 222 in a manner similar to the tapered part 22a of the counterbored hole 22.

During production, as shown by thick arrows in FIG. 4, the optical fiber group FG1 is inserted into the copper pipe CP of the main tail cable MTC through the copper pipe CP1 of the branch tail cable BTC1 and the through hole 21 of the branch member 20. Similarly, the optical fiber group FG2 is inserted into the copper pipe CP of the main tail cable MTC through the copper pipe CP2 of the branch tail cable BTC2 and the through hole 21 of the branch member 20.

Therefore, in the example shown in FIG. 4, each of the paths connecting the copper pipes CP1 and CP2 to the copper pipe CP in the through hole 21 is smoothly formed into an arc in a plan view. With such a configuration, the bending of the optical fiber groups FG1 and FG2 can be suppressed.

In the example shown in FIG. 4, the diameter of the through hole 21 is formed larger than the inner diameters of the copper pipes CP1 and CP2, and the inner diameter of the copper pipe CP is formed larger than the diameter of the through hole 21. Thus, when the optical fiber groups FG1 and FG2 are inserted, the leading ends of the optical fiber groups FG1 and FG2 can be suppressed from being caught in the step between the inner peripheral surfaces of the copper pipes CP1 and CP2 and the through hole 21, and the step between the through hole 21 and the inner peripheral surface of the copper pipe CP.

The branch member 20 is strong enough to withstand water pressure at a depth of 8000 m, and is made of, for example, a steel material, copper, a copper alloy (e.g., beryllium copper alloy). In order to ensure airtightness, as described above, the branch member 20 is brazed to the copper pipe CP of the main tail cable MTC and the copper pipes CP1 and CP2 of the branch tail cables BTC1 and BTC2, respectively. Further, the branch member 20 protects the optical fiber groups FG1 and FG2 in a manner similar to the copper pipes CP, CP1, and CP2, and also functions as a power supply line.

In this way, the material of the branch member 20 is selected in consideration of strength, a brazing property with copper pipes, electric resistance, etc. Since the electric resistance of the copper pipe is dominant as the electric resistance of the entire power supply line, the electric resistance has a low priority in selecting the material of the branch member 20.

Furthermore, since it is difficult to machine the through hole 21 branched in a Y-shape, in the production of the branch member 20, the branch member 20 is produced, for example, by additive manufacturing using metal powder (so-called metal 3D printer).

As an example, the branch member 20 is produced by additive manufacturing using maraging steel powder. By using high-strength maraging steel, the branch member 20 can be made thinner (i.e., smaller and lighter). Moreover, by thinning the branch member 20, heat removal during brazing is suppressed, and the brazing material becomes easily melted, thereby improving the weldability. Since a steel material has higher strength than that of copper or copper alloy, the branch member 20 can be made thinner. Furthermore, since thermal conductivity of a steel material is low, heat removal during brazing can be suppressed. For example, a thickness of a part of the branch member 20 where the counterbored hole 22 to be brazed to the copper pipe CP is formed can be made 2 mm or less (e.g., 1.2 mm).

As shown in FIGS. 3 and 4, the branch member 20 has a smooth outer shape corresponding to the Y-shaped through hole 21. On the other hand, a part of the branch member 20 between the pair of counterbored holes 221 and 222 into which the copper pipes CP1 and CP2 are inserted, respectively, protrudes outward.

Here, as will be described in detail later, the branch member 20 is insulation-molded. At the time of insulation-molding, if a recess is formed between the counterbored holes 221 and 222, a void is likely to be formed. In the branch member 20 shown in FIGS. 3 and 4, since a part of the branch part 20 between the counterbored holes 221 and 222 protrudes outward, the formation of a void at the time of insulation-molding is suppressed, and a withstand voltage is improved.

As shown in FIG. 3, corner parts of the branch member 20 positioned at boundaries between an outer peripheral surface and an end surface are chamfered. At the time of insulation-molding, if a corner part is formed in the branch member 20, a void is likely to be generated in the corner part. In the branch member 20 shown in FIGS. 3 and 4, since the corner parts are chamfered, the formation of a void at the time of insulation-molding are reduced, and the withstand voltage is improved. Further, the electric field strength itself at the corner is reduced, and thus the withstand voltage is improved.

<Method of Producing Tail Cable>

Figure 5:
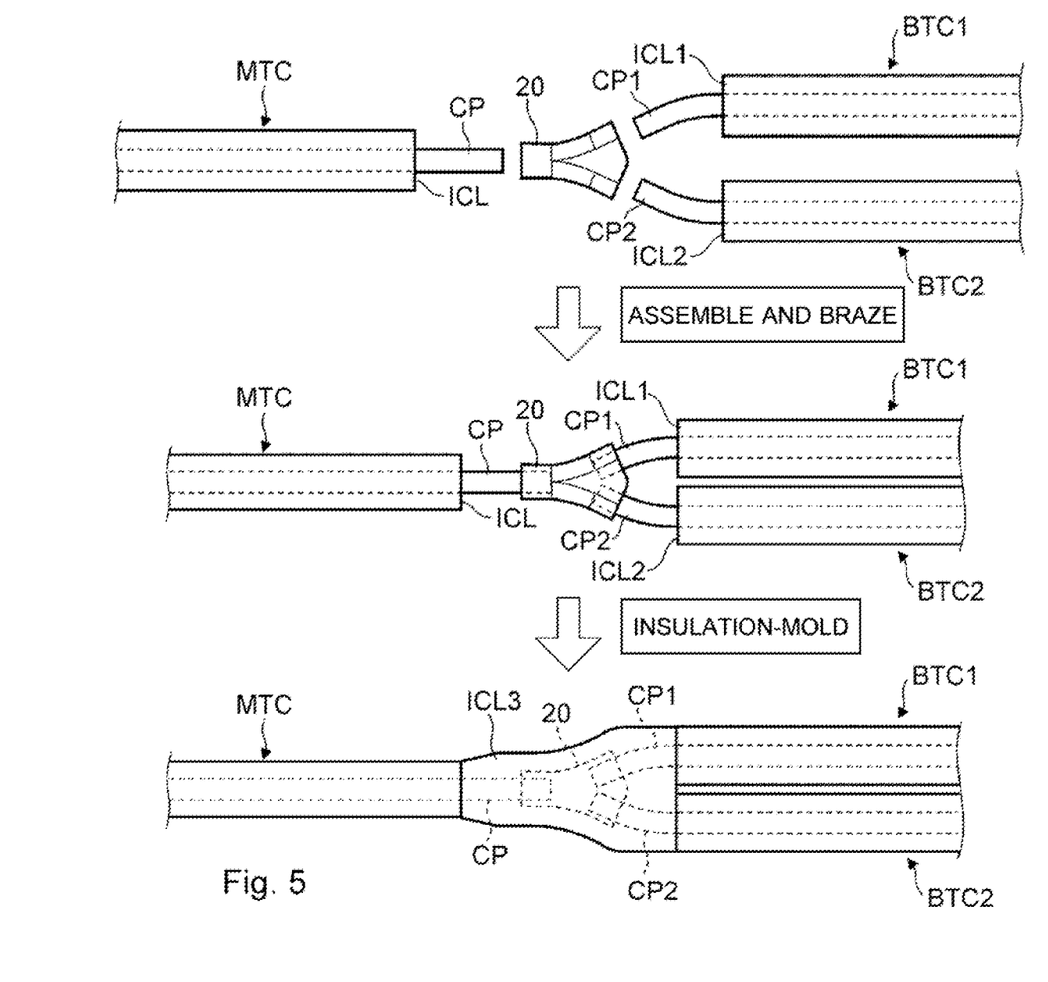
FIG. 5 is a plan view showing a method of producing a tail cable.

Next, a method of producing the tail cable will be described with reference to FIG. 5. FIG. 5 is a plan view showing the method of producing a tail cable. See also FIG. 4 as appropriate.

As described above, the tail cable is composed of the branch member 20, the main tail cable MTC, and the branch tail cables BTC1 and BTC2.

As shown in the upper row of FIG. 5, the main tail cable MTC includes the copper pipe CP having an outer peripheral surface coated with an insulating coating layer ICL. The branch tail cable BTC1 includes the copper pipe CP1 having an outer peripheral surface coated with an insulating coating layer ICL1. The branch tail cable BTC2 includes a copper pipe CP2 having an outer peripheral surface coated with an insulating coating layer ICL2. The insulating coating layers ICL, ICL1, and ICL2 are made of, for example, polyethylene.

First, as shown in the upper row of FIG. 5, the insulating coating layer ICL at one end of the main tail cable MTC inserted into the branch member 20 is removed to expose the copper pipe CP. The insulating coating layer ICL1 at one end of the branch tail cable BTC1 inserted into the branch member 20 is removed to expose the copper pipe CP1. Similarly, the insulating coating layer ICL2 at one end of the branch tail cable BTC2 inserted into the branch member 20 is removed to expose the copper pipe CP2. In the example shown in FIG. 5, after the copper pipes CP1 and CP2 are inserted into the branch member 20, the exposed copper pipes CP1 and CP2 are made to curve in advance so that the branch tail cables BTC1 and BTC2 become parallel to each other.

Next, as shown in the middle row of FIG. 5, the copper pipes CP, CP1, and CP2 are inserted into the branch member 20, assembled, and brazed.

The details are as described with reference to FIG. 4.

Next, as shown in the lower row of FIG. 5, the branch member 20 and the exposed copper pipes CP, CP1, and CP2 are insulation-molded and covered with an insulating coating layer ICL3. During insulation-molding, the insulating coating layer ICL3 is integrated with the insulating coating layers ICL, ICL1, and ICL2. The insulating coating layer ICL3 is made of, for example, polyethylene in a manner similar to the insulating coating layers ICL, ICL1, and ICL2.

After that, as shown by the thick arrows in FIG. 4, the optical fiber group FG1 is inserted into the copper pipe CP of the main tail cable MTC through the copper pipe CP1 of the branch tail cable BTC1 and the through hole 21 of the branch member 20. Similarly, the optical fiber group FG2 is inserted into the copper pipe CP of the main tail cable MTC through the copper pipe CP2 of the branch tail cable BTC2 and the through hole 21 of the branch member 20.

In this way, the tail cable is produced. The tail cable has a withstand voltage of, for example, 15 kV or more by the insulating coating layers ICL, and ICL1 to ICL3. Further, the insulating coating layers ICL, and ICL1 to ICL3 can suppress corrosion of the copper pipes CP, CP1, and CP2 and the branch member 20, which are made of metal.

<Method of Fixing Tail Cable>

Figure 6:
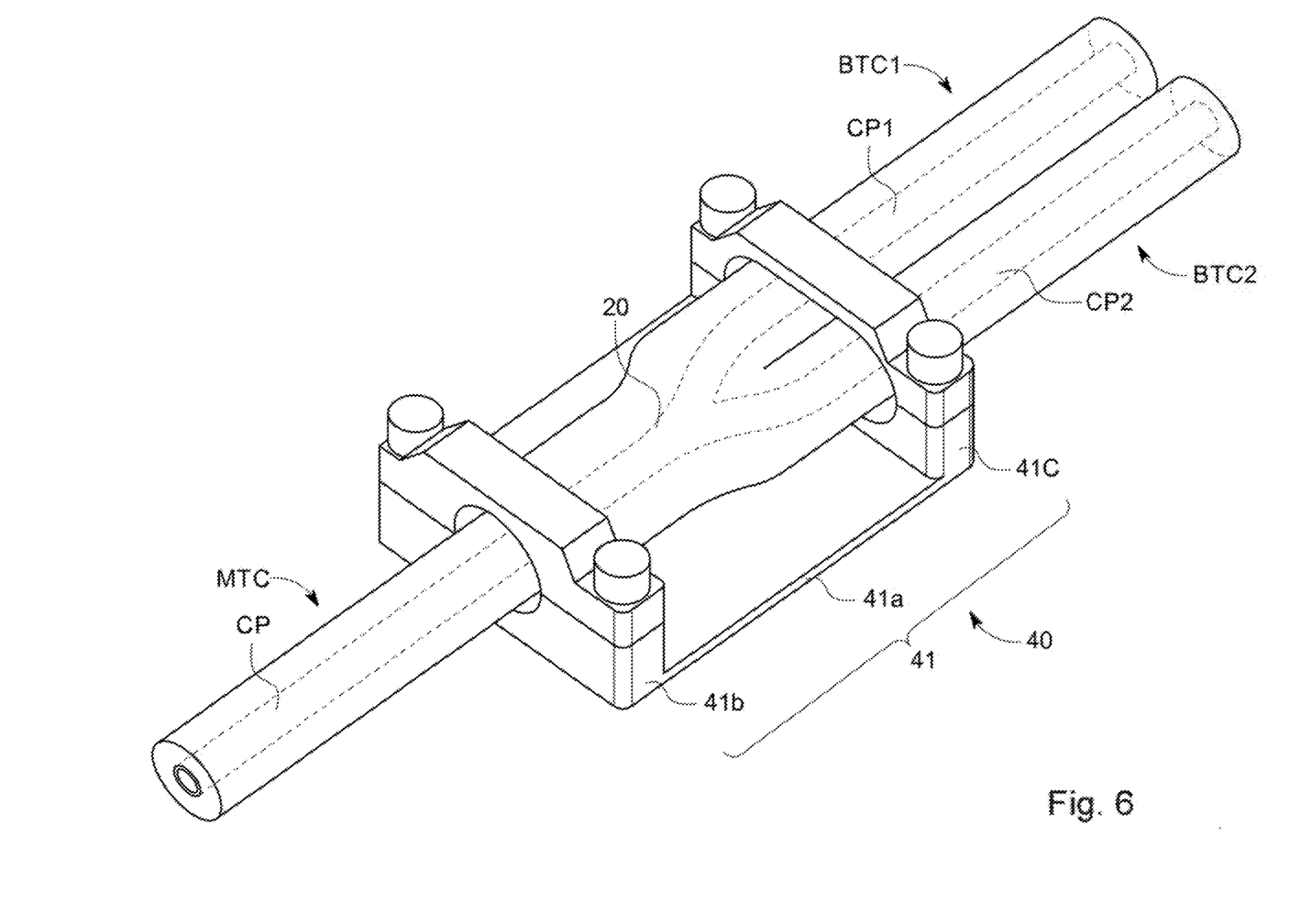
FIG. 6 is a perspective view showing an example of a fixing member 40.
Figure 7:
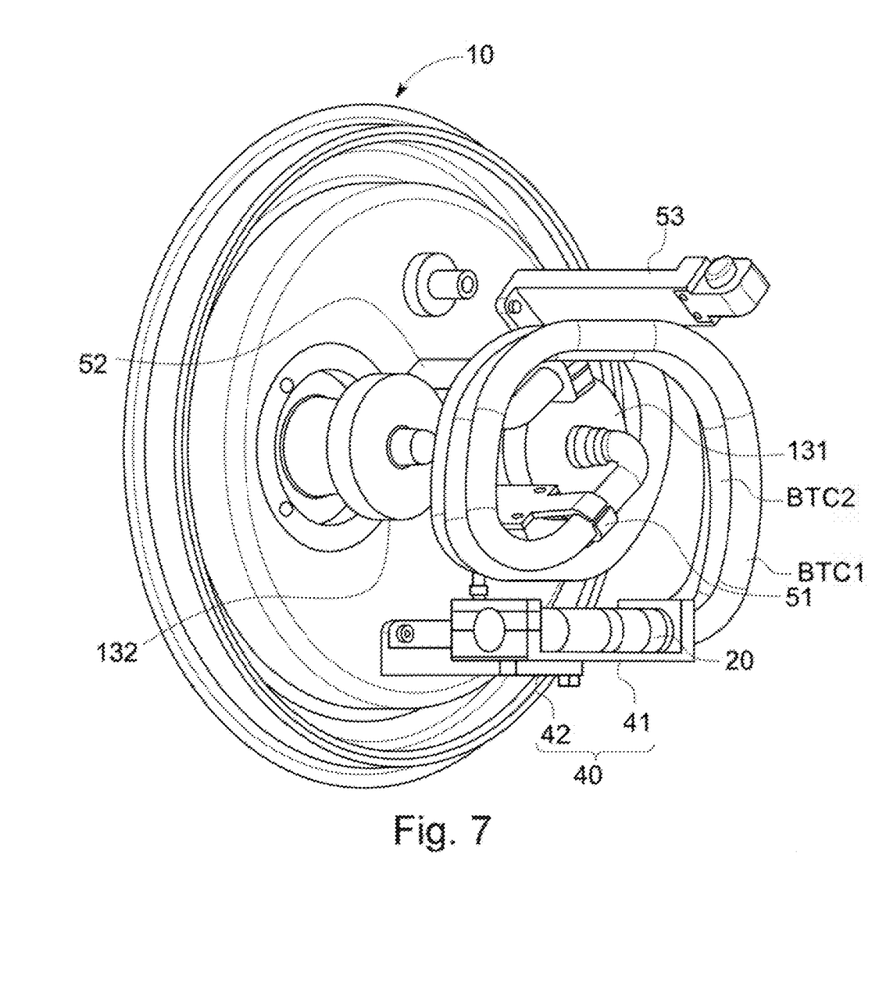
FIG. 7 is a perspective view showing a method of fixing the tail cable.
Figure 8:
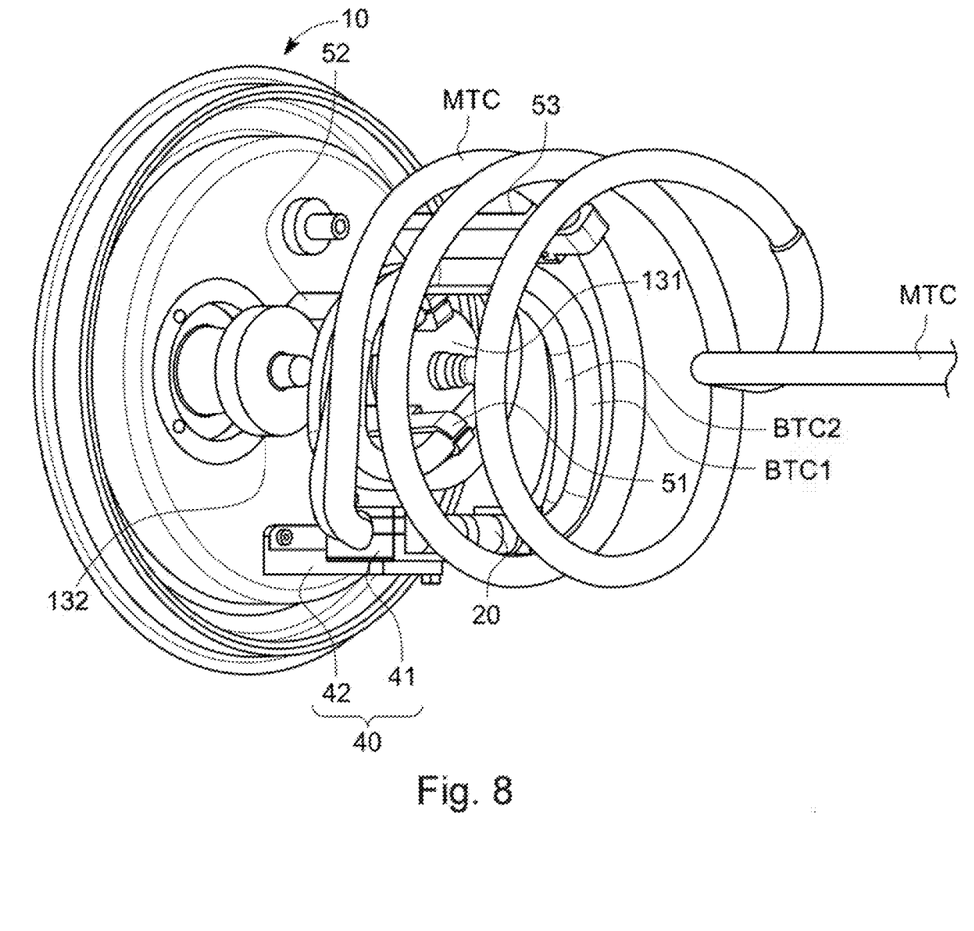
FIG. 8 is a perspective view showing the method of fixing the tail cable.
Figure 9:
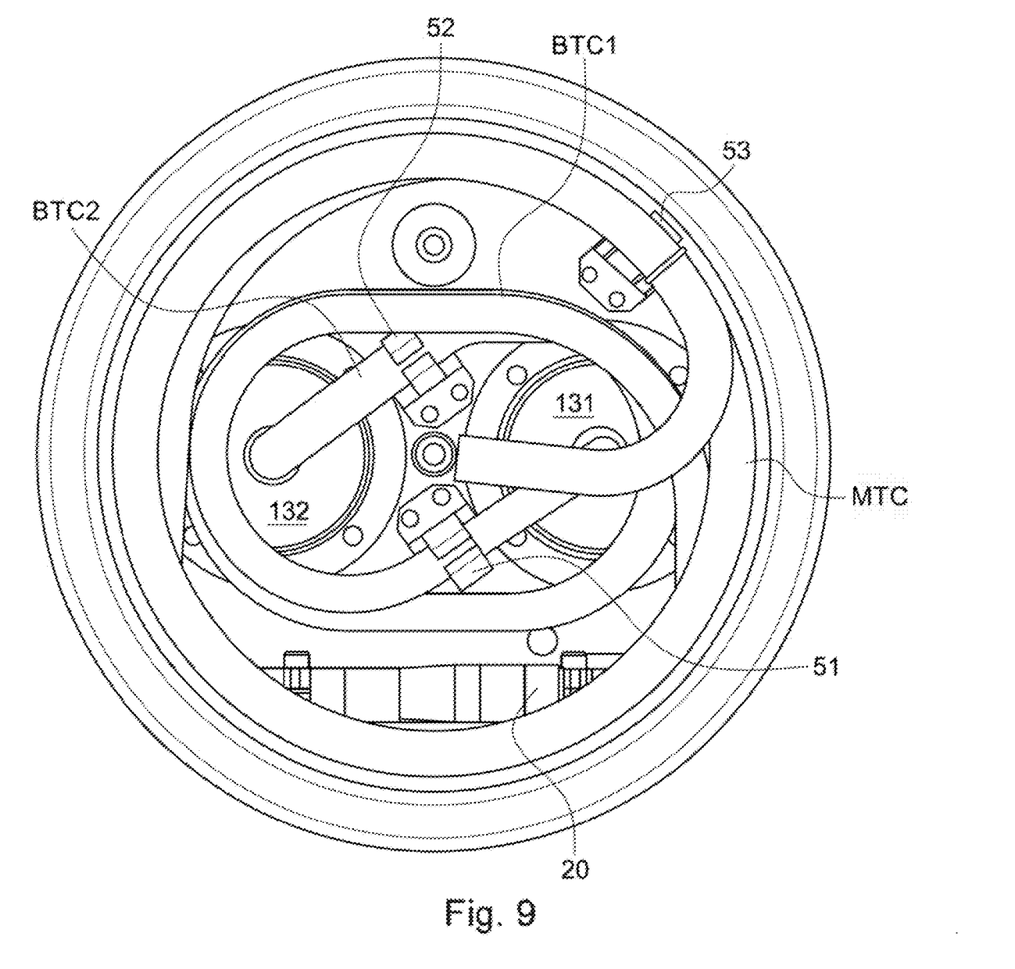
FIG. 9 is a front view showing the method of fixing the tail cable.

Next, a method of fixing the tail cable will be described with reference to FIGS. 6 to 9. FIG. 6 is a perspective view showing an example of the fixing member 40. FIGS. 7 and 8 are perspective views showing a method of fixing the tail cable. FIG. 9 is a front view showing a method of fixing the tail cable. As shown in FIGS. 6 to 8, the fixing member 40 includes a holder 41 and a leg part 42.

FIG. 6 shows the holder 41 of the fixing member 40. As shown in FIG. 6, the holder 41 holds and protects the fixing member 40. In the example shown in FIG. 6, the holder 41 includes a substrate part 41a and holding parts 41b and 41c. The branch member 20 is mounted on the substrate part 41a. The holding part 41b provided at one end of the substrate part 41a holds an end part of the main tail cable MTC coupled to the branch member 20. On the other hand, the holding part 41c provided at the other end of the substrate part 41a holds end parts of the branch tail cables BTC1 and BTC2 coupled to the branch member 20.

As shown in FIGS. 7 and 8, the holder 41 is fixed to the leg part 42. The leg part 42 is fixed to an end surface of the device main body 10 where the introduction parts 131 and 132 are provided. More specifically, the leg part 42 is a plate-like member provided so as to rise substantially vertically from the end surface of the device main body 10. The holder 41 is fixed to the leg part 42 so as to bond the leg part 42 to the substrate part of the holder 41.

As shown in FIGS. 7 and 8, the branch member 20 is fixed so that the end parts of the branch tail cables BTC1 and BTC2 coupled to the branch member 20 are aligned in a direction perpendicular to the end surface of the device main body 10. Further, the branch member 20 is fixed in such a way that the end parts of the branch tail cables BTC1 and BTC2 coupled to the branch member 20 become substantially parallel to the end surface of the device main body 10.

In particular, as shown in FIG. 7, the branch tail cable BTC1 is formed into a coil shape and connected to the introduction part 131. On the other hand, the branch tail cable BTC2 is formed into a coil shape and connected to the introduction part 132. Here, as shown in FIG. 7 (and FIG. 9), the introduction part 131 and the introduction part 132 are disposed symmetrically displaced from the center of the circular end surface of the device main body 10. FIG. 7 is a diagram in which the main tail cable MTC is removed from FIG. 8 for ease of understanding.

As shown in FIG. 7, the branch tail cable BTC1 is fixed to the device main body 10 by a cable holder 51 erected from the end surface of the device main body 10. The branch tail cable BTC2 is fixed to the device main body 10 by a cable holder 52 erected from the end surface of the device main body 10. The cable holders 51 and 52 are disposed symmetrically displaced from the center of the end surface of the device main body 10 between the introduction parts 131 and 132. That is, the cable holders 51 and 52 are provided on an inner side than the introduction parts 131 and 132 from the center of the end surface of the device main body 10. By providing the cable holders 51 and 52, the branch tail cables BTC1 and BTC2 can be formed into coil shapes while bending radii of the branch tail cables BTC1 and BTC2 are defined.

As shown in FIG. 8, the main tail cable MTC is also formed into a coil shape. The main tail cable MTC is fixed to the device main body 10 by a cable holder 53 erected from the end surface of the device main body 10. The cable holder 53 is provided on an outer side than the introduction parts 131 and 132 from the center of the end surface of the device main body 10. By providing the cable holder 53, the main tail cable MTC can be formed into a coil shape while a bending radius of the main tail cable MTC is defined.

In particular, as shown in FIG. 9, the coil diameters of the branch tail cables BTC1 and BTC2 are smaller than the coil diameter of the main tail cable MTC. Therefore, the coils of the branch tail cables BTC1 and BTC2 can be accommodated in an empty space inside the coil of the main tail cable MTC.

That is, the storage space of the tail cable can be made compact.

As described above, since the branch member 20 is fixed to the device main body 10 by the fixing member 40, the branch member 20 does not move even when an external force is applied to the branch member 20. This improves the durability of the tail cable. In particular, when the branch tail cables BTC1 and BTC2 are formed into coil shapes, a force is applied to root parts of the branch tail cables BTC1 and BTC2 in the insulating coating layer ICL3 shown in FIG. 5, and the insulating coating layer ICL3 can be suppressed from being broken.

The branch member 20 may be fixed to the device main body 10 before or after the branch tail cables BTC1 and BTC2 are introduced into the device main body 10 from the introduction parts 131 and 132.

The whole or part of the example embodiments disclosed above can be described as, but not limited to, the following supplementary notes.

(Supplementary Note 1)

A submarine device comprising:
  a main tail cable connected to a submarine cable;
  a first branch tail cable including a first group of optical fibers among a plurality of optical fibers included in the main tail cable;
  a second branch tail cable including a second group of optical fibers among the plurality of optical fibers;
  a branch member configured to couple the main tail cable to the first and second branch tail cables and including therein a through hole for branching the plurality of optical fibers included in the main tail cable into the first group and the second group; and
  a device main body including a first introduction part for introducing the first branch tail cable into the device main body and a second introduction part for introducing the second branch tail cable into the device main body, wherein the branch member is fixed to the device main body.

(Supplementary Note 2)

The submarine device according to Supplementary note 1, wherein
  each of the main tail cable and the first and second branch tail cables is formed into a coil shape, and
  coil diameters of the first and second branch tail cables are smaller than a coil diameter of the main tail cable.

(Supplementary Note 3)

The submarine device according to Supplementary note 1 or 2, wherein each of the first and second branch tail cables is fixed to the device main body.

(Supplementary Note 4)

The submarine device according to any one of Supplementary notes 1 to 3, wherein the main tail cable is fixed to the device main body.

(Supplementary Note 5)

The submarine device according to any one of Supplementary notes 1 to 4, wherein the main tail cable includes a copper pipe covering the plurality of optical fibers, the first branch tail cable includes a copper pipe covering the first group of optical fibers, the second branch tail cable includes a copper pipe covering the second group of optical fibers, and one end parts of the copper pipes of the main tail cable and the first and second branch tail cables are brazed to respective open ends of the through hole of the branch member.

(Supplementary Note 6)

The submarine device according to Supplementary note 5, wherein a counterbored hole is provided at each of the open ends of the through hole of the branch member, the one end part of each of the copper pipes of the main tail cable and the first and second branch tail cables is inserted in and brazed to each of the counterbored holes.

(Supplementary Note 7)

The submarine device according to Supplementary note 6, wherein a tapered part having a diameter increased outward from an inner peripheral surface of each of the counterbored holes is provided at the open end of the counterbored hole of the through hole, and a brazing part is formed in each of the tapered parts.

(Supplementary Note 8)

The submarine device according to Supplementary note 6 or 7, wherein a part of the branch member between a pair of the counterbored holes into which the copper pipes of the first and second branch tail cables are inserted protrudes outwardly.

(Supplementary Note 9)

The submarine device according to any one of Supplementary notes 5 to 8, wherein a diameter of the through hole is larger than inner diameters of the copper pipes of the first and second branch tail cables, and an inner diameter of the copper pipe of the main tail cable is larger than the diameter of the through hole.

(Supplementary Note 10)

The submarine device according to any one of Supplementary notes 1 to 9, wherein a corner part positioned at a boundary between an outer peripheral surface and an end surface of the branch member is chamfered.

(Supplementary Note 11)

The submarine device according to any one of Supplementary notes 1 to 10, wherein the branch member is made of maraging steel.

(Supplementary Note 12)

A method of configuring a submarine device comprising:

branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member;

introducing the first branch tail cable into a device main body through a first introduction part and introducing the second branch tail cable into the device main body through a second introduction part; and fixing the branch member to the device main body.

(Supplementary Note 13)

A submarine cable system comprising:

a submarine cable; and a submarine device connected to the submarine cable, wherein the submarine device comprises:

a main tail cable connected to a submarine cable;

a first branch tail cable including a first group of optical fibers among a plurality of optical fibers included in the main tail cable;

a second branch tail cable including a second group of optical fibers among the plurality of optical fibers;

a branch member configured to couple the main tail cable to the first and second branch tail cables and including therein a through hole for branching the plurality of optical fibers included in the main tail cable into the first group and the second group; and a device main body including a first introduction part for introducing the first branch tail cable into the device main body and a second introduction part for introducing the second branch tail cable into the device main body, and the branch member is fixed to the device main body.

Although the present disclosure has been described with reference to the example embodiments, the disclosure invention is not limited by the above. The configuration and details of the present disclosure may be modified in various ways that will be understood by those skilled in the art within the scope of the disclosure.

This application claims priority on the basis of Japanese Patent Application No. 2020-059950, filed Mar. 30, 2020, the entire disclosure of which is incorporated herein by reference.

REFERENCE SIGNS LIST

10 DEVICE MAIN BODY
11 INTERNAL UNIT
12 PRESSURE-RESISTANT HOUSING
20 BRANCH MEMBER
21 THROUGH HOLE
22, 221, 222 COUNTERBORED HOLE
22a, 221a, 222a TAPERED PART
30 JOINT COVER
40 FIXING MEMBER
41 HOLDER
41a SUBSTRATE PART
41b, 41c HOLDING PART
42 LEG PART
51, 52, 53 CABLE HOLDER
131, 132 INTRODUCTION PART
BTC1, BTC2 BRANCH TAIL CABLE
CP, CP1, CP2 COPPER PIPE
FG1, FG2 OPTICAL FIBER GROUP
ICL, ICL1 TO ICL3 INSULATING COATING LAYER
JB JOINT BOX
MTC MAIN TAIL CABLE
SC SUBMARINE CABLE

What is claimed is:

1. A submarine device comprising:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body, wherein
the branch member is fixed to the device main body.

2. The submarine device according to claim 1, wherein
each of the main tail cable and the first and second branch tail cables is formed into a coil shape, and
coil diameters of the first and second branch tail cables are smaller than a coil diameter of the main tail cable.

3. The submarine device according to claim 1, wherein each of the first and second branch tail cables is fixed to the device main body.

4. The submarine device according to claim 1, wherein the main tail cable is fixed to the device main body.

5. The submarine device according to claim 1, wherein
the main tail cable includes a copper pipe covering the plurality of optical fibers,
the first branch tail cable includes a copper pipe covering the first group of optical fibers,
the second branch tail cable includes a copper pipe covering the second group of optical fibers, and
one end parts of the copper pipes of the main tail cable and the first and second branch tail cables are brazed to respective open ends of the through hole of the branch member.

6. The submarine device according to claim 5, wherein
a counterbored hole is provided at each of the open ends of the through hole of the branch member,
the one end part of each of the copper pipes of the main tail cable and the first and second branch tail cables is inserted in and brazed to each of the counterbored holes.

7. The submarine device according to claim 6, wherein
a tapered part having a diameter increased outward from an inner peripheral surface of each of the counterbored holes is provided at the open end of the counterbored hole of the through hole, and
a brazing part is formed in each of the tapered parts.

8. The submarine device according to claim 6, wherein
a part of the branch member between a pair of the counterbored holes into which the copper pipes of the first and second branch tail cables are inserted protrudes outwardly.

9. The submarine device according to claim 5, wherein
a diameter of the through hole is larger than inner diameters of the copper pipes of the first and second branch tail cables, and an inner diameter of the copper pipe of the main tail cable is larger than the diameter of the through hole.

10. The submarine device according to claim 1, wherein
a corner part positioned at a boundary between an outer peripheral surface and an end surface of the branch member is chamfered.

11. The submarine device according to claim 1, wherein the branch member is made of maraging steel.

12. A method of configuring a submarine device comprising:
branching a main tail cable connected to a submarine cable into a first branch tail cable including a first group of optical fibers among a plurality of optical fibers included in the main tail cable and a second branch tail cable including a second group of optical fibers among the plurality of optical fibers through a branch member;
introducing the first branch tail cable into a device main body through a first introduction part and introducing the second branch tail cable into the device main body through a second introduction part; and
fixing the branch member to the device main body.

13. A submarine cable system comprising:
a submarine cable; and
a submarine device connected to the submarine cable, wherein
the submarine device comprises:
a main tail cable connected to a submarine cable;
a first branch tail cable including a first group of optical fibers among a plurality of optical fibers included in the main tail cable;
a second branch tail cable including a second group of optical fibers among the plurality of optical fibers;
a branch member configured to couple the main tail cable to the first and second branch tail cables and including therein a through hole for branching the plurality of optical fibers included in the main tail cable into the first group and the second group; and
a device main body including a first introduction part for introducing the first branch tail cable into the device main body and a second introduction part for introducing the second branch tail cable into the device main body, and
the branch member is fixed to the device main body.

* * * * *